(12) United States Patent
Mandhana et al.

(10) Patent No.: US 7,941,831 B2
(45) Date of Patent: May 10, 2011

(54) DYNAMIC UPDATE OF AUTHENTICATION INFORMATION

(75) Inventors: Taroon Mandhana, Redmond, WA (US); Saurabh Mahajan, Redmond, WA (US); Andrew Baron, Redmond, WA (US); Prashant Malik, Sammamish, WA (US); Amir Zohrenejad, Seattle, WA (US); Karthik Ranganathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 11/704,844

(22) Filed: Feb. 9, 2007

(65) Prior Publication Data

US 2008/0196090 A1    Aug. 14, 2008

(51) Int. Cl.
  *G06F 7/04*    (2006.01)
  *G06F 15/16*   (2006.01)
  *G06F 17/30*   (2006.01)
  *H04L 29/06*   (2006.01)
  *H04L 9/32*    (2006.01)

(52) U.S. Cl. .................... 726/5; 726/8; 713/168
(58) Field of Classification Search ....... 726/8; 713/168
   See application file for complete search history.

(56) References Cited

U.S. PATENT DOCUMENTS

| | | | |
|---|---|---|---|
| 6,970,869 | B1 | 11/2005 | Slaughter et al. |
| 6,996,714 | B1 | 2/2006 | Halasz et al. |
| 2003/0056096 | A1 | 3/2003 | Albert et al. |
| 2003/0177351 | A1 | 9/2003 | Skingle |
| 2003/0226036 | A1 | 12/2003 | Bivens et al. |
| 2005/0015490 | A1 | 1/2005 | Saare et al. |
| 2005/0120213 | A1 | 6/2005 | Winget et al. |
| 2006/0171537 | A1 | 8/2006 | Enright |
| 2006/0195893 | A1 | 8/2006 | Caceres et al. |
| 2006/0224518 | A1 | 10/2006 | Khusial et al. |
| 2006/0288406 | A1 | 12/2006 | Kuhn et al. |
| 2007/0101418 | A1* | 5/2007 | Wood et al. ............... 726/8 |
| 2007/0208936 | A1* | 9/2007 | Ramos Robles ........... 713/168 |

OTHER PUBLICATIONS

Matsunaga, et al., "Secure Authentication System for Public WLAN Roaming," downloaded from http://portal.acm.org/citation.cfm?id=941343&jmp=references&dl=portal&dl=ACM, dated 2003, pp. 113-121.
Asokan, et al., "Man-in-the-Middle in Tunnelled Authentication," downloaded from http://www.saunalahti.fi/~asokan/research/tunnel.pdf; dated Oct. 24, 2002, pp. 1-13.
Non-final Office Action dated May 24, 2010 in U.S. Appl. No. 11/704,624.
Final Office Action dated Nov. 26, 2010 in U.S. Appl. No. 11/704,624.

* cited by examiner

*Primary Examiner* — Shin-Hon Chen
(74) *Attorney, Agent, or Firm* — Wolf, Greenfield & Sacks, P.C.

(57) ABSTRACT

A framework is provided that decouples credential acquisition from authentication processes using those credentials in a way that facilitates dynamic update of credential information. An authentication component may receive credential information for authentication of a user or a device for access to a resource. During interactions with an external authenticator, the authentication component may identify that updated credential information is required and issue a request to the application including credential parameters defining the updated credential information. An application component receiving the request may acquire updated credential information from a user or another entity. In addition, the authentication method may issue notifications to the application. The framework enables the application to update credentials in a context specific way.

20 Claims, 7 Drawing Sheets

DYNAMIC UPDATE OF AUTHENTICATION INFORMATION

BACKGROUND

Frequently in computer systems, access to some resource, such as a network or files stored on the network, is restricted to authorized entities. For example, resources may be made available only to authorized users or from authorized devices. Accordingly, before access to a resource is provided, an entity seeking access may be authenticated.

Authentication may be performed according to a protocol that uses a set of credentials. As part of the protocol, a device may exchange credentials with some authentication mechanism that, if proper credentials are provided according to the protocol, can enable the device to access a resource. An authentication mechanism may be, for example, an access control server.

Many different types of authentication protocols are available, and each type may use different credentials or different types of credentials. To facilitate the exchange of credential information, authorization components in the software in both the device and the authentication mechanism may communicate. To account for the wide range of possible protocols, many computing devices incorporate an authentication framework that accepts methods, each of which, when invoked, can execute an authorization protocol. A widely used authentication framework is the Extensible Authentication Protocol (EAP).

EAP is an Internet Engineering Task Force (IETF) standard that provides a framework for network access clients and authentication servers to host plug-in modules, or EAP methods, for many authentication methods and technologies. EAP, which was originally created as an extension to Point-to-Point Protocol (PPP), is highly flexible and supports arbitrary network access authentication methods. EAP is used for IEEE 802.1x specification-based (enterprise) network access to authenticate network access server (NAS) devices such as Ethernet switches and wireless access points (AP). With EAP authentication protocols such as Challenge Handshake Authentication Protocol (CHAP), Microsoft Challenge Handshake Authentication Protocol (MS-CHAP), and MS-CHAP version 2 (MS-CHAPv2), a specific authentication mechanism is chosen during the link establishment phase. During the authentication phase, the negotiated authentication protocol allows the exchange of credential information.

The exact authentication scheme to be used is negotiated by the network access client and the authentication server (e.g., the Remote Authentication Dial-In User Service (RADIUS) server). A connecting client that associates with an access point cannot gain access to the network until the user performs a network logon. After association, the client and the authentication server may exchange EAP messages to perform mutual authentication, with the client verifying the authentication server credentials, and vice versa.

Currently, various EAP methods use different set of credentials to authenticate with the authentication server (e.g., a backend RADIUS server). Acquiring these credentials from the user or a device and using them for authentication is specific to each EAP method and is handled completely inside the EAP method. For example, if during authentication, additional information is required for the EAP method to complete authentication, the EAP method may control information presented on a user interface through which that information may be obtained.

SUMMARY OF INVENTION

A device may be provided with a generic authentication framework. According to the framework, an authentication component, such as an EAP method, can describe, using a credential interface, credentials that it needs to execute an authentication protocol. The credential description is independent of a specific EAP method and the framework can be extended to any authentication component that supports the credential interface.

By using the credential interface, applications can manage credentials by receiving credential descriptions and then collecting credentials from a user, from memory, from a device, or any other suitable location. The application may collect credentials from a user by creating a user interface, which may be built by the application based on the credential description. Because the user interface is built by the application, a user experience around providing credentials may be improved by using context information from within the application when, credentials are requested.

Furthermore, the credential interface may be used by the authentication component to communicate information to the application during authentication. During execution of the authentication protocol, the authentication component may issue a notification and/or a request for additional information required to complete the authentication. In response to the request, which may be described using the credential interface and handled independently of the EAP method, the application may collect, through a user interface, the requested additional information.

Because the EAP method can communicate to the application relating to the status of an attempted authentication, an improved user experience can be provided because the application can present status information, such as a notice requesting updated credentials, in an appropriate context. Further, because the application is aware that updated credential information has been obtained, dynamic updating of other components of the device that use the credentials may occur seamlessly.

In one aspect, the invention provides a computer-readable medium having computer-executable components comprising an authentication component (e.g., an EAP component) that, when executed, performs a method for authenticating an entity such as a user or a device using first credential information. During authentication, the authentication component may identify that second credential information is required to complete the method for authenticating. The computer-readable medium also comprises at least one application component, separate from the authentication component, that, when executed, obtains the first credential information and the second credential information for the entity.

In another aspect, the invention provides a process of operating a client device to authenticate an entity. According to the process, first credential information is obtained with a first component and provided to a second component. The process includes interacting between the second component and an authenticator external to the client device using the first credential information and identifying, by the second component, that second credential information is required. The process further includes providing, by the second component, second parameters of the second credential information, obtaining, with a first component, second credential information consistent with the second parameters, and interacting between the second component and the authenticator external to the client device using the second credential information.

In yet another aspect, the invention provides a process of communicating between an application and an EAP component executed in a device. The process includes identifying, by the EAP component, that credential information is required. The EAP component obtains the credential information from the application.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a user experience can be improved by decoupling acquisition and use of credentials, which also allows unifying credential management for different authentication methods. The inventors have further appreciated that by providing a mechanism to manage credentials and any related information independently of an authentication method, more functionality may be obtained for authentication purposes. For example, dynamic updating of credentials and related information during authentication may be performed. Furthermore, the framework may provide device authentication when the user may or may not be present, allowing a device to logon to a network before a user logs on to the device.

Such a framework may be implemented with an interface comprising an application component (e.g., software application) and an authentication component, separate from the application component. The interface may be implemented as four application programming interfaces (APIs), wherein a first application programming interface may provide a credential definition from the authentication component to the application component, and a second application programming interface may provide credential information from the application component to the authentication component. A third application programming interface may provide a definition of additional information required for authentication from the authentication component to the application component, and a fourth application programming interface may provide the additional information from the application component to the authentication component.

The credential definition may be obtained, for example, in a form of parameters, such as, for example, credential parameters, or in any other suitable form. The application component may obtain credential information consistent with the credential definitions from a user or a device.

The credential information may be obtained through a user interface such as, for example, a user interface enabling a SSO experience, whereby the user may need to enter a single set of credentials for network access and user logon. Alternatively, the credential information may be obtained from the device. The collected credential information may then be provided to the authentication component to perform authentication. As an option, the credential information may be stored for future use.

During authentication, it may be required that the credential information be modified. Furthermore, additional information may be requested and/or notification may be issued by the authentication component. In response to a request for some additional information from the authentication component, the application provides an interface through which the user can enter the requested information.

Figure 1:
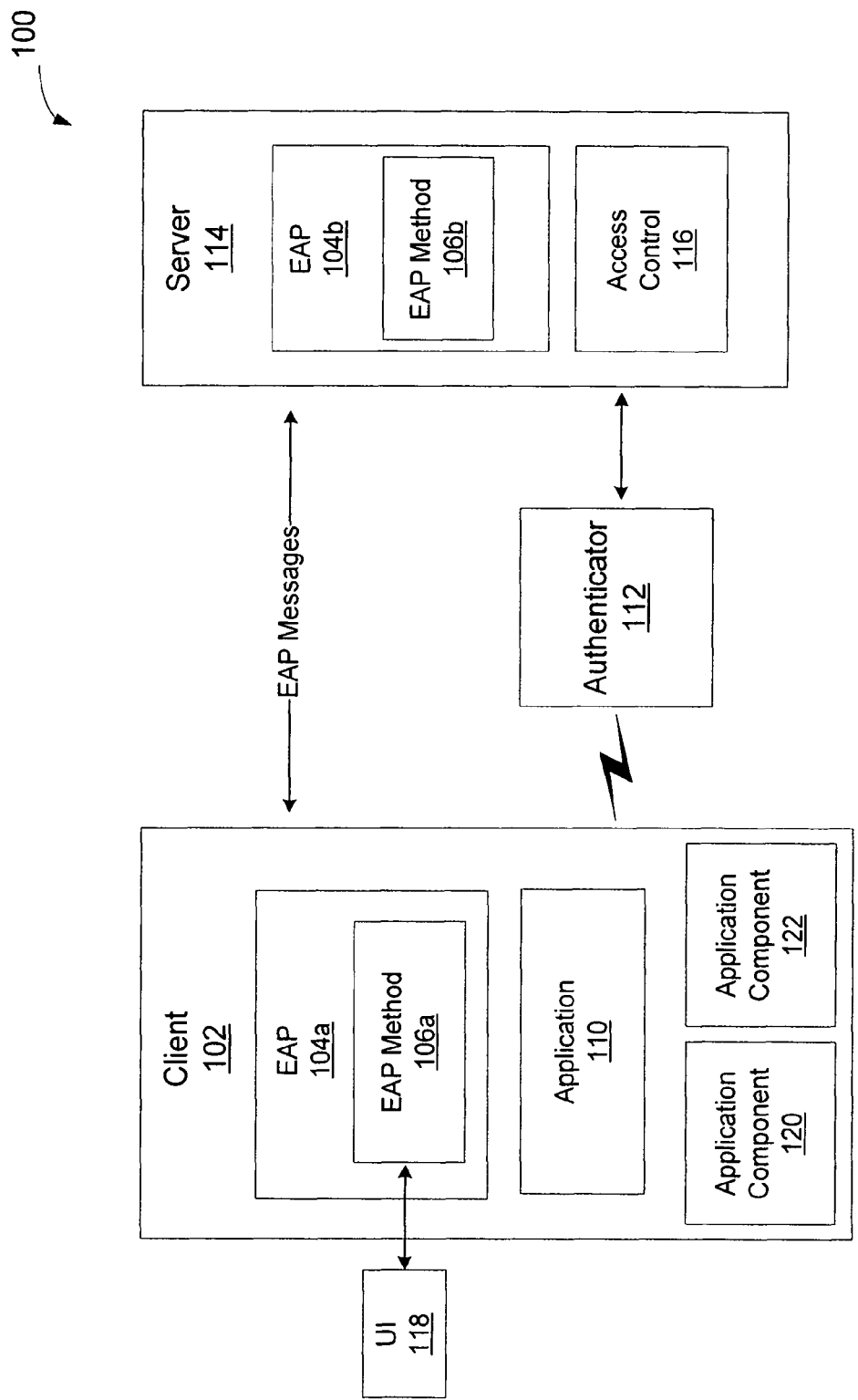
FIG. 1 is a block diagram illustrating architecture of a prior art EAP framework.

FIG. 1 is a schematic diagram of an EAP framework 100. A client, or an EAP peer, 102 is a network access client that may be attempting to access a wireless or wired network. Authenticator 112 may be an access point (AP) or a network access server (NAS) that require EAP authentication prior to granting access to the network. An authentication server 114 may be a server that negotiates the use of a specific EAP method with the client 102, validates the clients' credentials (e.g., user name and password), and authorizes access to the network.

The client 102 comprises an EAP host 104a including an EAP method 106a and an application 110. In the example illustrated, the application 110 may be supplicant software for an IEEE 802.1x-based enterprise wireless network or other software that requires access to a resource for which authentication is required.

EAP host 104a may be a set of internal components that provide architectural support for one or more EAP methods in the form of plug-in modules. For successful authentication, both the client and authentication server typically need to have EAP authentication modules installed that interact to perform authentication according to a desired protocol. Therefore, the EAP method 106a installed on the client 102 may be designed to interact with EAP method 106b installed on the authentication server 114 to perform a desired authentication protocol.

The EAP method 106a is schematically shown to be coupled to a user interface 118 for collecting credentials from users and/or devices. The coupling is shown to demonstrate that the EAP method in the prior art framework of FIG. 1 is responsible for both collecting and managing the credentials and related information. The client 202 may include an application component 120 and an application component 122 that may employ authentication to gain access to a resource. The application components 120 and 122 may be, by way of example only and not to limit the scope of the invention, e-mail, calendaring, and scheduling applications that access servers for which authentication is required. It should be appreciated that client 102 may comprise other suitable components that are not illustrated in FIG. 1.

The server 114 may comprise EAP host 104b including EAP method 106b and an access control component 116. A common access control protocol utilized by the IEEE 802.1x security standard is a Remote Authentication Dial-In User Service (RADUIS). The RADIUS is an Authentication, Authorization, and Accounting (AAA) protocol and is often used for authentication of users and/or applications and for securing access to services in wireless networks. Access control component 116 may implement RADIUS or other access control protocols. It should be appreciated that sever 114 may comprise other suitable components.

An authenticator 112 may rely on a centralized AAA server (e.g., RADUIS server), to authenticate clients. In this case, logical communication of EAP messages is provided between the EAP method 106a installed on the client 102 and the EAP method 106b installed on the authentication server 114, and authenticator 112 does not need to support any specific EAP method.

EAP is extensible through EAP methods. To add support for a new EAP method, an EAP method library file may be installed on both the client and the authentication server. Thus, though one EAP method is shown in each of client 102 and server 114, any number of methods may be present on a client, depending on the number and types of resources to which that client may gain access and the authentication protocols used for those resources.

Different EAP methods may use different sets of credentials to authenticate with the authentication server. For example, the MS-CHAPv2 authentication protocol uses a user name and password for authenticating to the RADIUS server. In addition, an EAP method may use different credential information at different times, depending on how the method is configured. For example, a method may be configured to use either logon user name and password of the currently logged in user or a different user name/password pair.

Though, not all credentials are in the form of user name and password. For example, the EAP-Transport Layer Security (EAP-TLS) protocol may use a certificate from a smart card or a certificate from a disk for authentication purposes. Accordingly, methods exist that use a variety of types of credentials from a variety of sources.

Acquiring the credentials from a user or a device and using them for authentication is typically specific to each EAP method and is handled completely inside the EAP method. The EAP method typically handles any functionality associated with dynamic update of credentials during authentication or at other time points. This may complicate building generic software solutions that unify credential management for different EAP methods.

Figure 2:
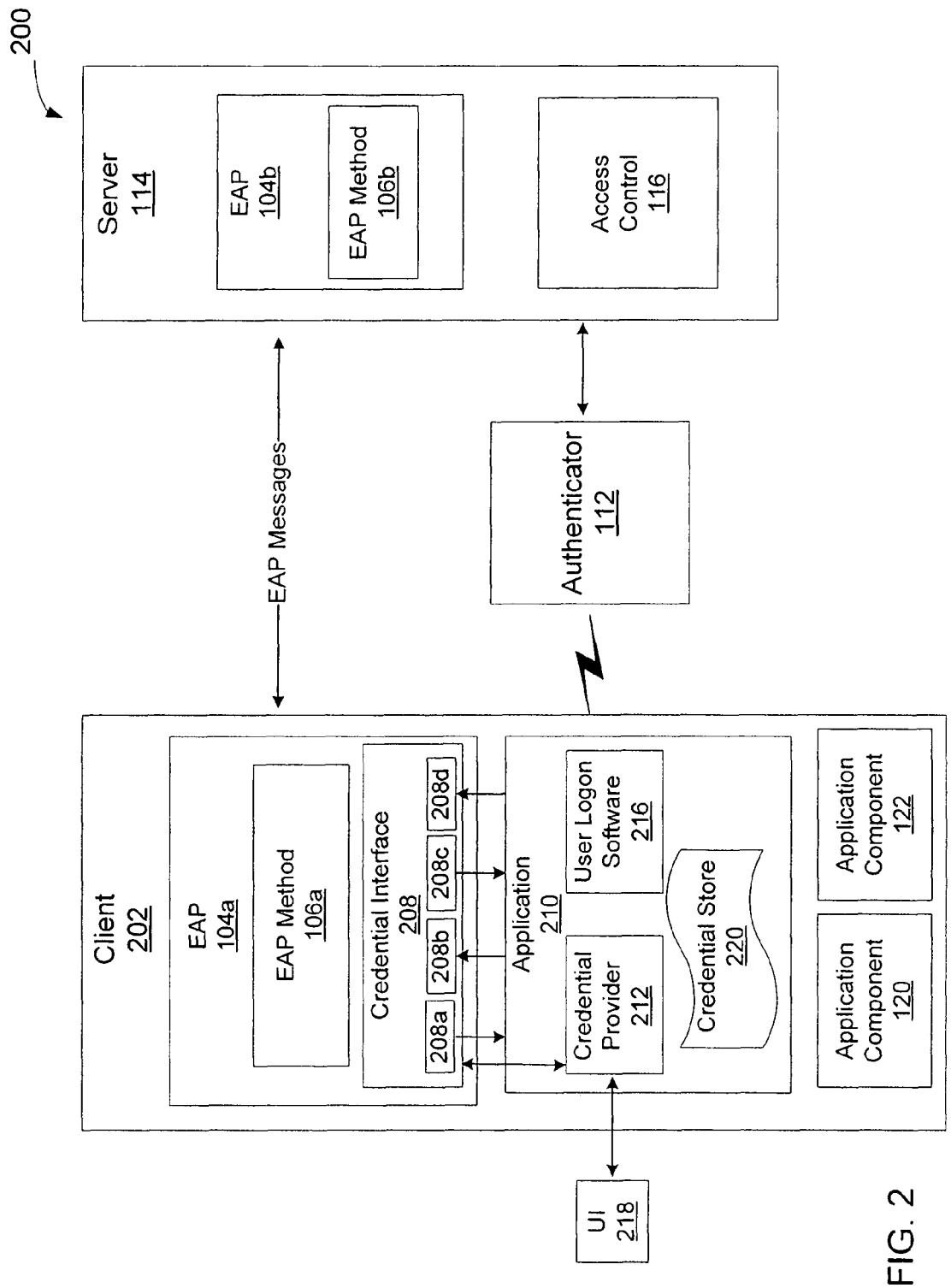
FIG. 2 is a block diagram illustrating architecture of an exemplary embodiment of an authentication framework according to the invention.

FIG. 2 is a block diagram illustrating architecture of an authentication framework 200 according to embodiments of the invention. The framework 200 includes a network access client 202, an authenticator 112 which may be, for example, an AP or a NAS, and an authentication server 114. Embodiments of the invention may be directed to clients accessing IEEE 802.1x-based enterprise wireless networks that may support one or more different EAP methods for authenticating to backend RADIUS servers. Embodiments may also be directed to other media utilizing EAP-based authentication, such as, for example, Ethernet 802.1x-based networks, virtual private networks (VPN), dial-up networking, and EAP over user datagram protocol (UDP). However, because the framework is generic, neither the access control protocol nor the authentication protocol used is a limitation on the invention, and the framework may be used in any suitable computing environment.

In the embodiment illustrated, client 202 and authentication server 114 include respective EAP hosts 104a and 104b that may have EAP method 106a and EAP method 106b installed, respectively. The authentication server 114 includes an access control component 116.

In some embodiments, the client 202 may deploy the Microsoft® Windows® Vista™ operating system. The authentication server 114 may deploy the Microsoft® Windows® Server® software which may host RADIUS as an access control protocol. The EAP hosts 104a and 104b may comprise EAPHost architecture of the Windows® Vista™ and Windows® Server® software, which provides third-party vendors with extensibility opportunities to develop and distribute different EAP methods. However, the specific software used for implementing the components of the authentication framework are not critical to the invention and any suitable components may be used and any of the components described herein may be implemented in any suitable programming language.

To facilitate separating the acquisition of credentials from performing authentication using credentials, the EAP method 106a may expose a credential interface 108 through which the EAP method 106a may describe the credentials that it needs to execute an authentication protocol. Any EAP method that can support such an interface may potentially utilize the framework 200. The credential interface 208 may return a description of the credentials using credential parameters or other suitable representation. In some embodiments, credential parameters are represented as an array of so-called "credential specifiers," where each credential specifier may describe a credential needed for authentication.

In some embodiments, each call to credential interface 108 may result in the EAP method 106a returning the same credential specifiers. However, in some embodiments, an EAP method may be configurable and may require different credentials in different configurations. The credential interface 208 may take as an argument a configuration parameter. Such a parameter provides the EAP method with the ability to change the description of credentials that it needs based on the configuration of the EAP method.

In the embodiment illustrated, credential interface 208 may be implemented as four application programming interfaces (APIs). One API, 208a, may act as a provisioning interface which, when called by an application, returns a description of credentials EAP method 106a uses for executing an authentication protocol. A second API, 208b, may receive those credentials and when called may cause the EAP method 106a to execute the authentication protocol using those credentials.

A third API, 208c, may act as a dynamic notification interface, which may provide status information to the application, such as a notification of the progress of the authentication and/or a request to the application for additional information needed to complete authentication. The request, initialized by the EAP method or some other trigger, may be a request for additional information that may be needed, for example, for an EAP method to complete authentication. For example, the request may be provided to prompt the user to enter a new password upon expiry of an old password.

A fourth API, 208d, may receive the requested additional information and when called may cause the EAP method 106a to complete authentication. It should be appreciated that the API 208d may provide functionality of the API 208b, and vice versa. Likewise, the API 208c may provide functionality similar to that of API 208a, and vice versa. Accordingly, in some embodiments, functionality of both API 208a and 208c may be provided through same API. Also, the functionality of APIs 208b and 208d may be provided through the same API.

Each API may be coded in the C programming language. However, credential interface 208 may be implemented in any suitable way using any suitable programming language.

Application software 210 in some embodiments may be any software that requires access to a resource for which authentication is required. However, it is not necessary that application 210 access such a resource and may be any component or components that manage credentials. Application software 210 may be operating system software or may be client software. In embodiments that include Windows® Vista™ operating system clients, an application 210 may be client software and may be referred to as a supplicant. Client 202 may be referred to as a supplicant as well.

Application 210 may pass authentication requests to EAP host 104a, which may then be carried out by an EAP method installed in client 202. It should be appreciated that application 210 may run side-by-side with EAP methods (e.g., EAPHost in Windows® Vista™) and may use EAP host 104a and one or more EAP methods.

Application 210 may in turn include one or more components that perform authentication functions or functions for which authentication is required. For example, application 210 may include user logon software 216, such as Winlogon in Windows® Vista™ operating system. User logon software 216 may interact with EAP method 106a to request credential description and provide other credential collection and management functionality.

The application may also include a credential provider 212 that may obtain credentials in accordance with the credential description provided by EAP method 106a. Credential provider 212 may obtain credentials in any suitable way. Credentials may be obtained from users, from credential store 220 or otherwise obtained from the computing device on which client 202 is implemented.

Credential provider 212 may be implemented in any suitable way. For example, it may be implemented as a plug-in module that may define a user interface 218 to gather credentials. The user interface 218 may be a GUI, a command line interface, or any other suitable interface.

Credential provider 212 may be coupled to credential interface 208 so that credentials obtained may be provided to an EAP method.

Once collected, the credentials may also be retained for future use. The collected credentials may optionally be stored for future use in a credential store 220. Credential information may be stored in an encrypted format or otherwise stored in a secure fashion. If credential information is stored, it may be updated by application 210 whenever application 210 detects change in that information, such as may occur, for example, when a password expires.

Though a single credential provider is shown, multiple credential providers (e.g., a user name and password credential provider and a smart card credential provider), which can be user-selected and/or event-driven, may be installed on the client to obtain different types of credentials or credentials in different contexts. For example, user interface 218 may appear differently when application 210 is collecting credentials when a user first establishes a connection to a network than when the user reestablishes a connection that was interrupted during a session. It should be appreciated that embodiments of the invention provide a functionality enabling independent software components to create appropriate user interfaces for acquiring credentials from the user or to obtain the credentials in any other suitable way from any other suitable source.

Application 210 may be any software component that may require authentication at any time. However, in many enterprise settings, a client is given access to resources when a user of a client device is authenticated. Frequently, authentication is based on a user name and password. In many instances the client device is programmed to be "locked" until an authorized user logs on by providing an appropriate user name and password. Accordingly, FIG. 2 illustrates that application 210 may include logon software to control the logon process so that a user may be authenticated.

In addition, application 210 may communicate with application components 120 and 122 to provide these components with credential information. The application components 120 and 122 may be, for example, e-mail, calendaring, and scheduling applications. Application 110 may provide updated credential information to application components 120 and 122. The notification may take place at different times, including, but not limited to, while the user is using the application components.

In embodiments implemented on Windows® Vista™ operating system, user logon software implemented as Winlogon communicates with LogonUI which, using credential providers, draws user interface 218 on a display or other output device associated with the device on which client 202 is implemented. In FIG. 2, user interface 218 is shown by way of example only as coupled to credential provider 212. Though FIG. 2 illustrates credentials being obtained through a user interface 218, credential provider 212 may obtain credentials in any suitable way. For example, credential information may be stored within the device implementing client 202. Alternatively, such a device may be equipped with hardware components that provide credentials. For example, credentials may be in the form of a token, digital certificate, smart card based certificate or any other suitable form and may therefore be obtained from a device that reads a smart card or stores a certificate.

Regardless of the source of credentials, credential provider 212 may use a credential description, such as a credential specifier, provided through credential interface 208 (e.g., using API 208a), to obtain the appropriate credentials. The credential specifier may include, by way of example and not to be limiting, the following information:

CredentialType

The Credential Type may include but not be limited to one of the types discussed hereinbelow.

LogonUsername Username used for logging to a device.

LogonPassword Password used for logging on to a device.

NetworkUsername Username specifically for network access.

NetworkPassword Password specifically for network access.

SmartCardPin Pin for the attached smartcard.

PreSharedKey Shared Secret.

GenericToken Token number for a token device owned by the user.

GenericEdit A specific credential not captured by any of the above.

CredentialName

The Credential Name is a name that may be used to refer to the credential when it is presented to a user for input or other purposes.

CredentialFlags

The Credential Flags may be used to describe different properties of the credential, such as, for example, properties given hereinbelow.

NonDisplayable specifies that credential consists of sensitive information that should not be displayed in a user interface (e.g., password, SmartCard Pin, etc.).

NonPersistable specifies that the credential should not be persisted on a disk on any storage device (e.g., Smartcard Pin and others).

CredentialSize may be used to describe any size restrictions associated with the credential (e.g., maximum or minimum length for the credential).

In embodiments of the invention, the user interface 218 may take credentials as an array of credential name/value pairs at start up or during authentication. The framework 200 may provide a mechanism ensuring that an EAP method can be invoked at any time for authentication purposes if credentials are available and is not limited to operation only at start up or at user logon.

In some embodiments, API 208c facilitating dynamic update functionality may be called as DynamicUpdateCredentialRequest( ), with the call made by the authentication component to an application (e.g., application 210 or any other suitable application). The parameters in this call may include, by way of example and not to be limiting, the following information:
DynamicUpdateCredentialRequestType
    CredentialRequest
    CredentialExpiry
    StatusNotification
    User Acceptance confirmation.

The dynamic update credential request type may be accompanied by a list of credential specifiers that may include information as described above.

An application may call the authentication component using API 208d as DynamicUpdateCredentialRespone( ). The parameters in this call may include, by way of example and not to be limiting, the following information:
DynamicUpdateCredential ResponseType
    CredentialRequestResponse
    CredentialExpiryResponse
    UserAcceptanceConfirmationResponse The dynamic update credential response type may be accompanied by a list of credential specifiers that may include information as described above.

By separating the collection of credential information from execution of an authentication protocol, functions may be performed that facilitate use of client 202. As one example, a Single Sign-on (SSO) function may be implemented. As part of the SSO, a user is prompted for credential information once, even though multiple authentication protocols may be executed, each using a subset of the obtained credentials. For example, in the traditional enterprise setting, a user may log into a device implementing client 202 by providing credential information. A user authentication protocol may be performed to complete the logon process. Subsequently, a second authentication protocol may be performed to authenticate the user to a network. Accordingly, client 202 may include multiple authentication methods, one for authenticating a user at logon and a second for authenticating a user to acquire network access. In some enterprise environments, both user logon and network access are performed using the same user name and password. However, if separate credentials are required for user logon and network access, application 210 may determine the credentials needed by obtaining a credential description from a method performing authentication at user logon and from a method performing authentication as part of obtaining network access. Application 210 may then request through user interface 218, or any other suitable mechanism, that the user provide both sets of credential information as part of a single step.

Even if user logon and network access use the same credential information, separating the acquisition of credential information from the use of the credential information may simplify the burden of the user of providing that information. For example, if the credential information provided at logon is incorrect or changes and therefore needs to be reentered, application 210, because it manages the collection of credential information, can determine that the credential information for network access has also changed and supply the appropriately changed credential information to the method obtaining network access.

This capability allows framework 200 to support an SSO experience. SSO is a tool that has been developed to simplify and streamline user logon, whereby a user may be required to provide user authentication information once to access multiple applications, devices, and systems. With such a tool, a user may enter credential information once for network connectivity and user and/or device logon. Though, the SSO experience is not limited to just the functions and may be used with any other desired combination of authentication functions.

During authentication or at any other time, an EAP method may request that additional credential information be collected and provide a description of the additional credential information. As a result, application 210 or any other suitable application, separate from application 210, may provide a user interface to collect the additional credential and related information consistent with the description and send the collected information to the EAP method. The EAP method may also issue notifications (e.g., informative messages) that do not require any action, but may be displayed to a user and contribute to improving user logon and authentication experience.

Figure 3:
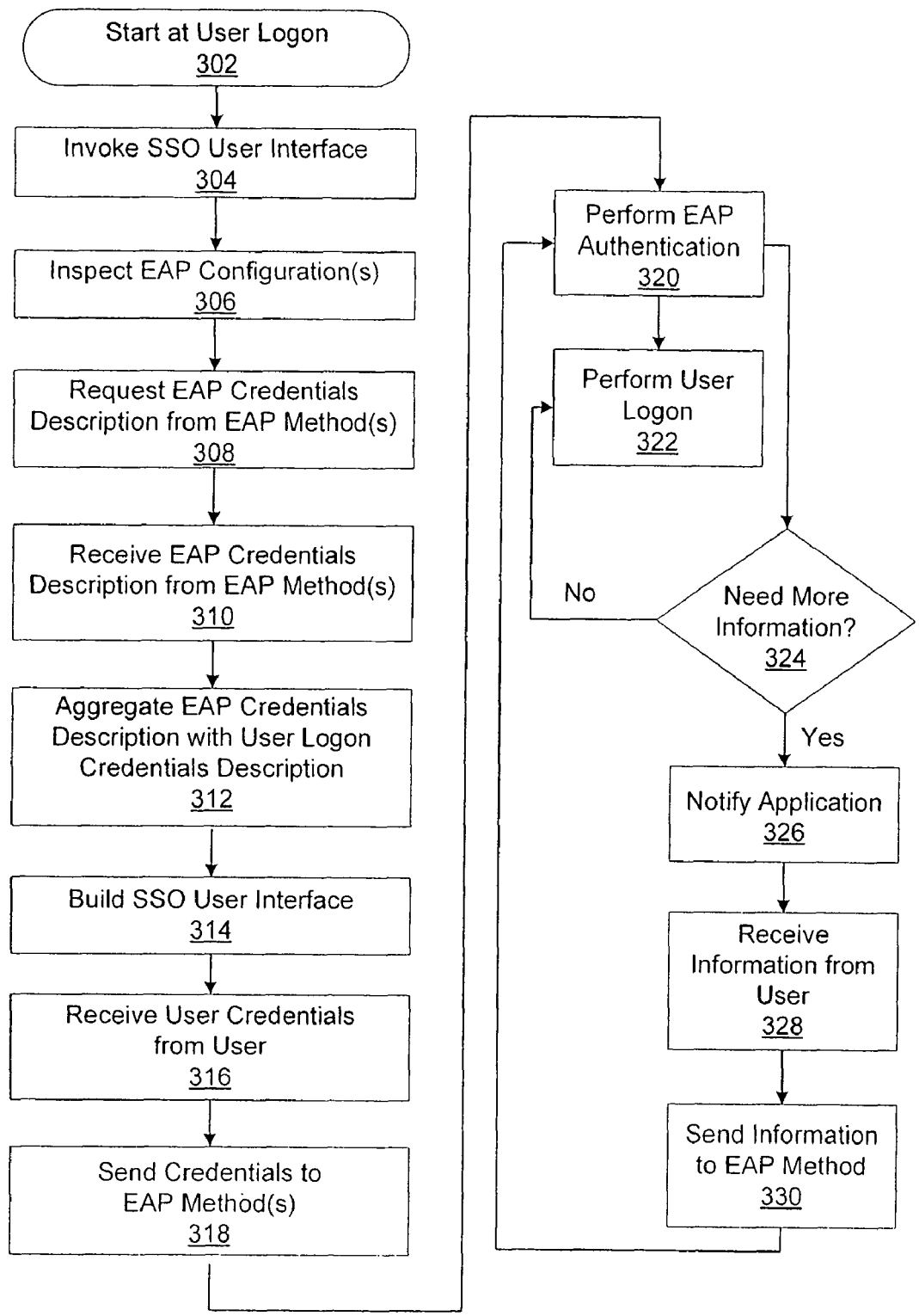
FIG. 3 is a flowchart illustrating credential collection and provisioning implementing a Single Sign-on that may be implemented using the framework of FIG. 2.

FIG. 3 is a flowchart illustrating steps in a process of operating a credential collection framework according to embodiments of the invention that may implement an SSO process. In embodiments of the invention, an SSO component may capture credentials through user input via user interface 218 at the time of user logon. The captured credentials may then be used to establish network connectivity based on a subset of these credentials. Another subset of these credentials may be utilized for user logon.

Referring to FIG. 3, the SSO process starts, in this example, at a user logon at a step 302. As one example, user logon may start when a user types a specific key sequence or the device implementing client 202 is powered on. At logon, user logon software 216 may invoke the SSO, component based on any suitable criterion, in a step 304. For example, user logon software 216 may be invoked when a user needs to perform a first time logon to a domain joined machine (in which case no stored credentials may be available) and connect to a network (e.g., the 802.1x network). It should be appreciated that user logon software 216 may be any suitable user logon software.

In a step 306, user logon software 216 may inspect a configuration of an EAP method to be used to connect to the network or other EAP methods that may be used for logon. Using the framework 200, the credential management software 212 may request, in a step 308, that the EAP methods describe the credentials needed to authenticate the client. Similar calls may be placed to other EAP methods that may execute authentication protocols with the network. Such requests may be made by one or more calls through credential interface 208.

In response to the request made in step 308, the descriptions of the credentials may be received in a step 310. The user logon software 216 may then aggregate the descriptions of the EAP credentials needed for the network access with the user logon credentials needed to logon the user, in a step 312 to create a credential set. The same credential set may be used for both user logon and network connectivity or subsets may be used for each function, depending on the specific EAP methods used.

The credential description provided by the EAP method may enable user logon software 216, using one or more credential providers (e.g., credential provider 212), to build a dynamic user interface (e.g., user interface 218) prompting the user to enter credentials consistent with the description of the credentials parameters, in a step 314. In a step 316, the required credentials entered by the user may be received. A subset of these credentials may be supplied to the EAP method as credential name/value pairs using the credential interface (e.g., credential interface 208) exposed by the EAP method, in a step 318. It should be appreciated that a single set of credentials may be required to authenticate network access and user logon. Alternatively, two separate sets of credentials may be required for network access authentication and user logon.

Upon receiving the required credentials, the EAP method 106 may perform an authentication using these credentials, in a step 320. At a step 322, a subset of these credentials may be provided to another authentication component, whether another EAP method, or a logon software that takes steps necessary for user logon to one or more devices, machines, domains, or other entities.

The EAP method may determine, in a step 324, whether any additional information may be required. This information may be, for example, a new password upon expiry of the old password. If the answer is affirmative, the EAP method may notify the application about the required information. The notification may include description of the required information provided in any suitable form. In addition, the notification may include informative messages that do not request any action. An example of such informative message may be, for example, a notification of the use that a new password entered by the user does not meet backend policy requirements. If the application was notified (e.g., credential interface 208) that some additional information is required, the application may receive the information form the user, as a step 328, upon which the information may be sent, in a step 330, to the EAP method to perform authentication, in step 320. If in step 324 it was determined that no additional information is required to complete authentication, a subset of the collected credentials may be provided, in step 322, to another authentication component, whether another EAP method, or a logon software that takes steps necessary for user logon to one or more devices, machines, domains, or other entities.

Though credentials may be obtained at logon, there may be instances in which network connectivity is desired even with no user logged on. Therefore, embodiments of the invention may allow network connectivity be established before user logon. This feature may be useful for processes occurring at logon time (e.g., running logon scripts, including but not limited to group policy logon scripts, updating group policy objects, maintaining roaming user profiles, and other). Though, credentials may be obtained other than from a user.

In situations where there is no user logged on to a device and/or machine and if the device and/or machine does not support the concept of a logon (e.g. phones), an EAP method may try to use credentials associated with the device and/or machine. However, such credentials may not be available in all deployments. For example, a machine not joined to a domain or an unprogrammed smartphone may not have the right certificate to authenticate to the network. As a result, it might not be possible for the device and/or machine to obtain network connectivity in such deployments.

The framework 200 provided by embodiments of the invention allows decoupling credentials acquisition from the EAP method, thus permitting a software application (e.g., user logon software 216) to gather credentials required by the EAP method and then use these credentials to establish network connectivity. Network connectivity can be established regardless of a presence of a user on the device and/or machine or provisioning of a machine through joining to a domain.

Figure 4:
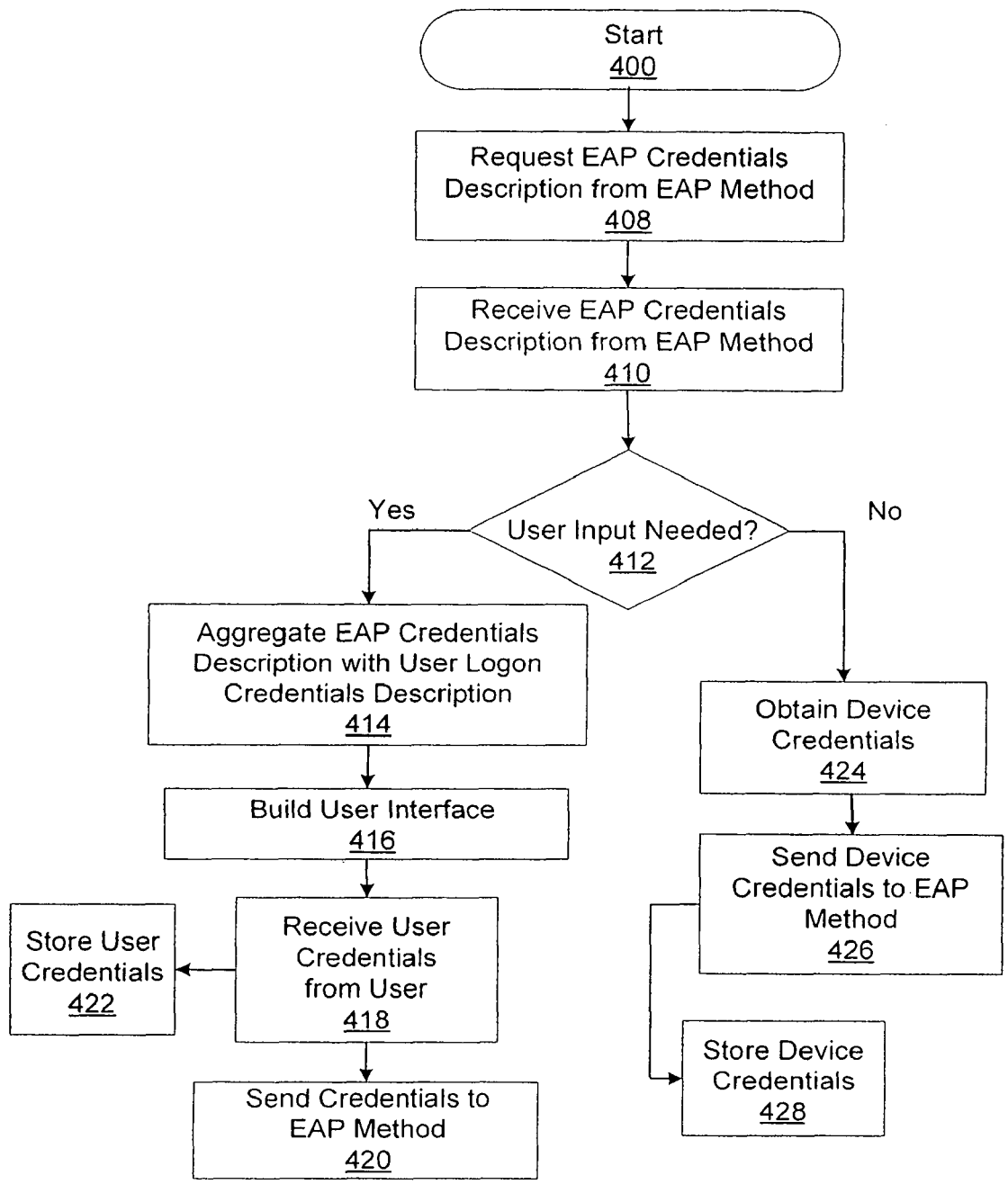
FIG. 4 is flowchart illustrating steps performed by an application for credential collection and provisioning implementing a Single Sign-on according to embodiments of the invention.

FIG. 4 is a flowchart illustrating steps performed by an application for credential collection and provisioning implementing or device authentication according to embodiments of the invention. It should be appreciated that the application may be logon software that is a portion of application 210 or any other suitable application. In the embodiment illustrated, device logon may be performed even without user input or express user logon.

Logon software may be invoked either explicitly by the user or through a trigger (e.g. when an EAP method configuration indicates that credentials need to be provided by the user), in a step 400. Logon software may inspect the configuration to be used to connect to the network.

Using the framework 200, in a step 408, logon software may request the EAP method describe the credentials needed to authenticate with the network using this EAP method. In response, the EAP method may provide the EAP credential description, possible through credential interface 208 so that user logon software 216 will receive the description from the EAP method, in a step 410.

In a step 412, it may be determined whether user input is needed. If the answer is affirmative, the description of credentials needed to authenticate network access may optionally be aggregated with the user logon credentials description, in a step 414. The credentials description provided by the EAP method enables user logon software to draw a dynamic user interface (e.g., user interface 218), prompting the user to enter credentials consistent with the credentials description, in a step 416. The user credentials may then be received from the user in a step 418. The received credentials may be supplied to the EAP method as credential name/value pairs using the credential interface 208 exposed by the EAP method, in a step 418. Following this, the credentials are sent to the EAP method, in a step 420. The credentials may optionally be stored in credential store 220.

If in step 412 it is determined that the user input is not needed, the device credentials or other stored credentials may be obtained, in a step 424. The device credentials or other stored credentials may then be sent, in a step 426, to the EAP method for the authentication performed by the EAP method using these credentials. The device credentials or other stored credentials, along with the EAP method configuration, may optionally be stored in an appropriate machine/device-wide store (e.g., credential store 220) for subsequent connectivity, which is shown in a step 428.

Figure 5A:
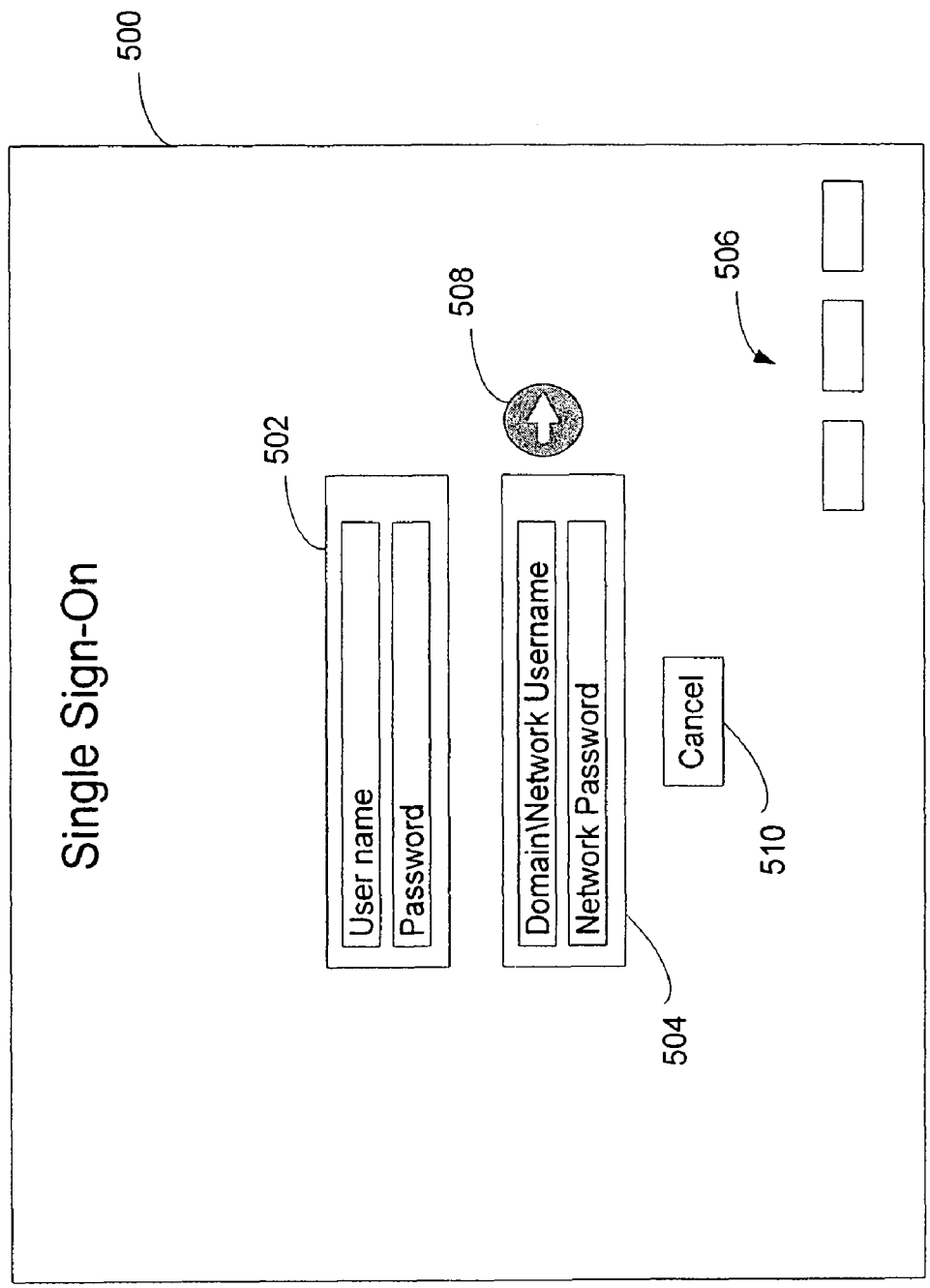
FIG. 5A is a schematic diagram illustrating a user interface displaying a Single Sign-on with separate sets of credential providers for user logon and network access that may be implemented using the framework of FIG. 2.

FIG. 5A is a schematic diagram illustrating a user interface 500 providing SSO with separate sets of credential providers for user logon and network access. The user logon may be managed by user logon software 216 or any other suitable component of client software. Additional interactive user interfaces that are required for the logon process may be drawn. For example, when a user has to change a password, either on a first time user logon or on an expired password, interactive user interfaces may be provided.

FIG. 5A illustrates that a graphical user interface that may provide a single-sign-on experience when network authentication and user logon use different authentication methods requiring different credentials. Thus, a credential input area 502 comprising user name and password may be required to login the user and a credential input area 504 comprising network username and password may be required for network authentication. Embodiments of the invention may enable an SSO tool to build an interface through which the user is prompted once for both sets of credentials for network authentication and for user logon. A "cancel" button 510 and a "go" button 508, as well as additional buttons and indicator 506 (e.g., "switch user," progress bar, etc.) may be provided to facilitate user interaction with the SSO interface. In the embodiment illustrated, the SSO interface of FIG. 5A may be built by operating system software. However, it should be appreciated that embodiments of the invention may allow for addition of third party network authentication methods that provide the SSO experience.

Figure 5B:
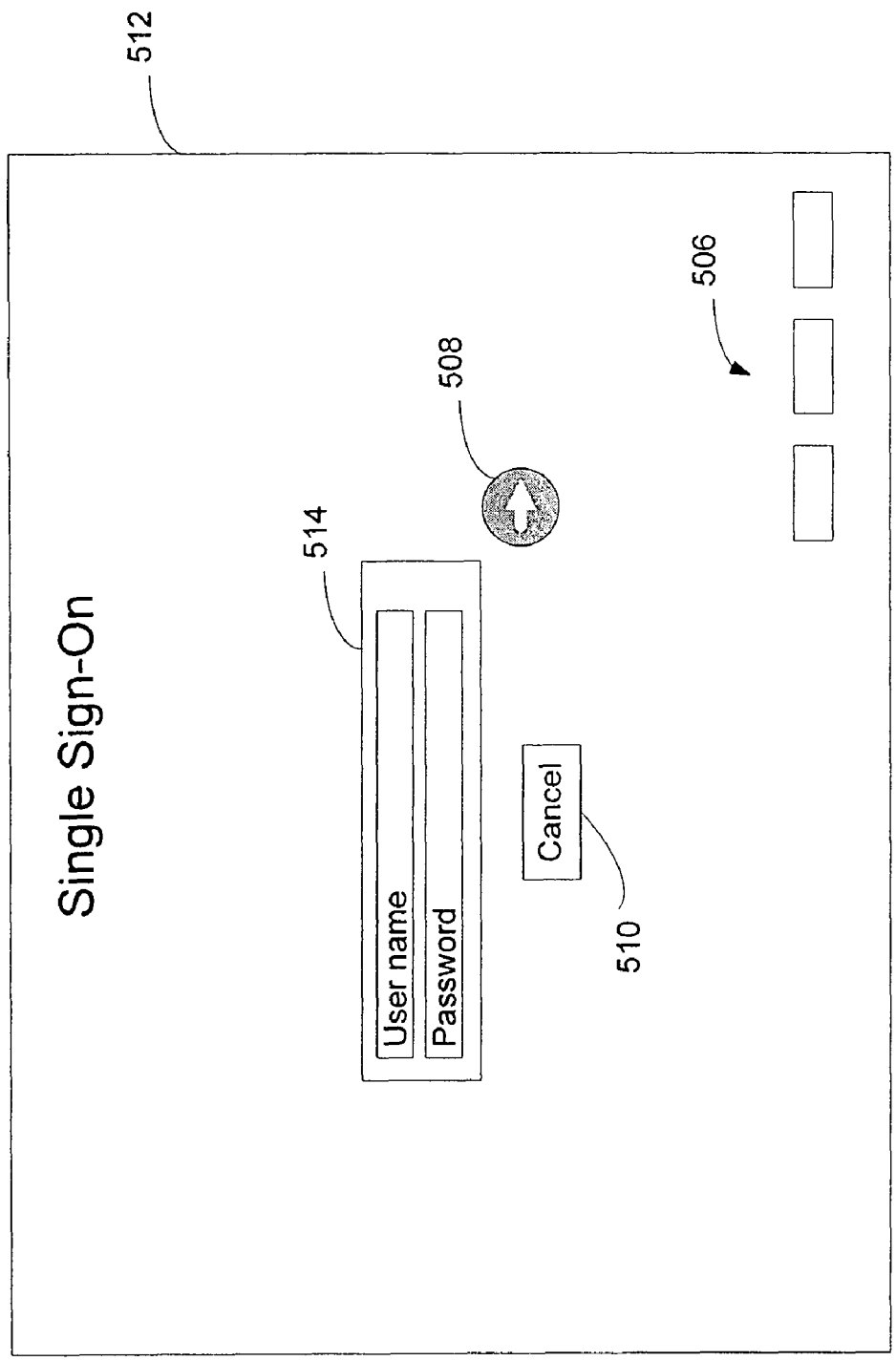
FIG. 5B is a schematic diagram illustrating a user interface displaying a Single Sign-on with a single set of credential providers for user logon and network access that may be implemented using the framework of FIG.

As another example, FIG. 5B illustrates a user interface 512 which prompts the user to enter a single credential set 514. Such an embodiment may be used when a single set of credentials is used for multiple purposes. If network authentication is required, the set of credentials 514 may be used for both user logon and network authentication. The network authentication may not be required, in which case the credential set 514 is provided to collect user logon credentials only.

Figure 6:
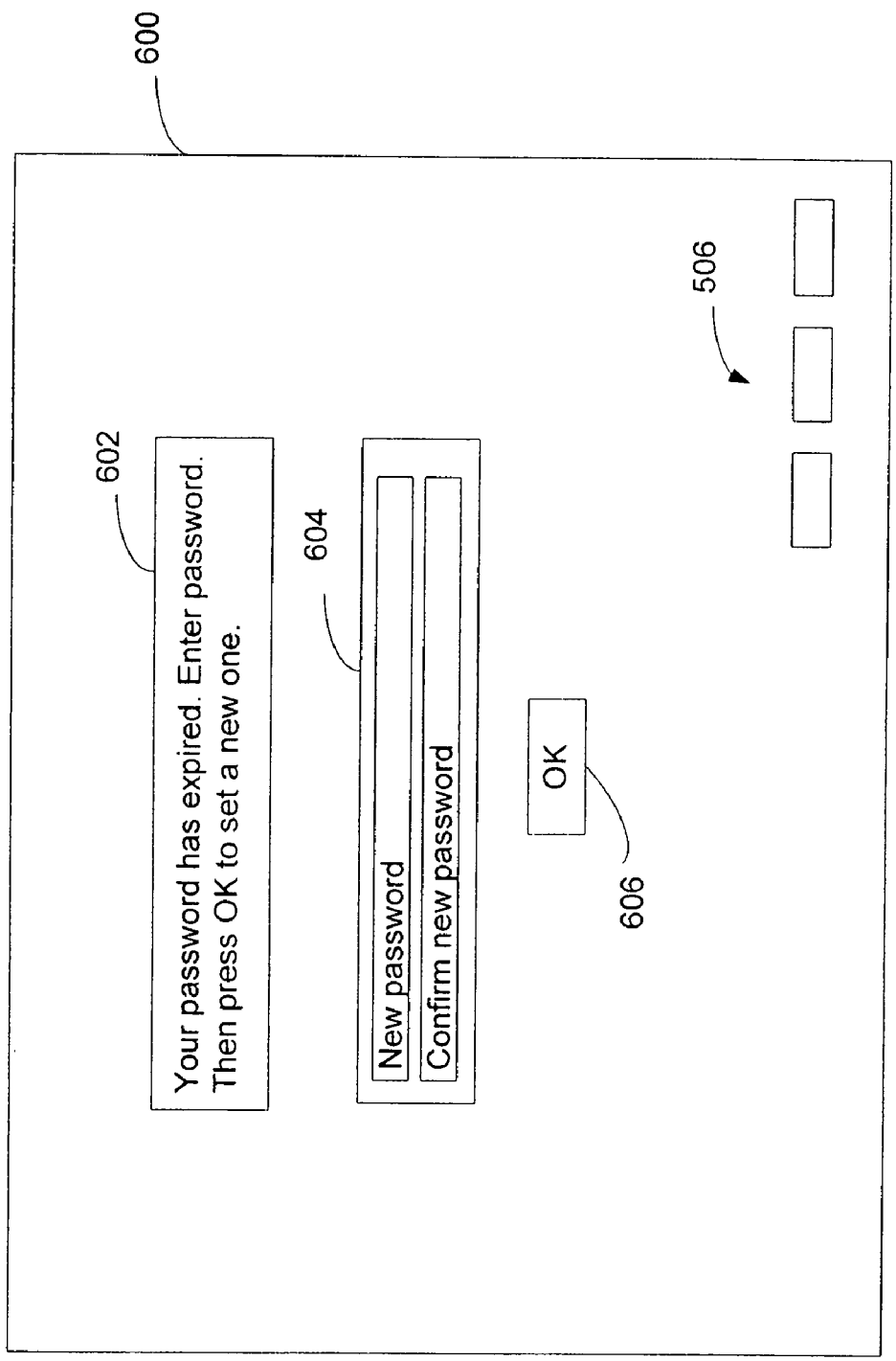
FIG. 6 is a schematic diagram illustrating a user interface for collecting credential information from the user during authentication that may be implemented using the framework of FIG. 2.

FIG. 6 illustrates a user interface 600, drawn by an application in response to an information request from an EAP method, which prompts the user to change an expired password. In the embodiment illustrated, user interface 600 notifies the user of a requirement to change a password in a block 602. A password update area 604 may be provided whereby the user may enter and confirm the new password. Upon entering the new password, the user may press an "OK" button 606 to send the new password to the EAP method. Additional suitable user interfaces may be provided to collect other credential information and/or information related to credential information. The user interfaces may issue informative messages to the user.

In summary, embodiments of the invention provide the framework that decouples credential collection and dynamic update from an EAP method by providing the unifying credential description mechanism. The framework provides an interface which allows acquiring credential description from an authentication method needed by this method to perform authentication, collecting credentials consistent with the description, and providing the collected credentials to the authentication method. The authentication method may request for dynamic updates of the collected credentials during authentication, which may be handled by the framework in such a manner that information required for the updates is collected independently of the EAP method. The framework also enables the SSO that may provide network connectivity at the time of user logon, which may be established using single set of credentials required for network connectivity and user logon. The SSO tool may simplify user experience. Furthermore, the framework allows device authentication when user may or may not be present.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-readable storage medium having computer-executable instructions that, when executed by at least one processor, implement components comprising:
    an authentication component that, when executed by the at least one processor, performs a method for authenticating an entity using first credential information, wherein, during authentication, the authentication component may identify that second credential information is required to complete the method for authenticating;
    an interface component that:
        receives the first credential information from at least one application component and provides the first credential information to the authentication component;
        when the authentication component identifies that second credential information is required to complete the method for authenticating, notifies the at least one application component that the second credential information is required; and
        after the at least one application obtains the second credential information in response to the notification from the interface component, provides the second credential information to the authentication component; and
    the at least one application component, separate from the authentication component, that, when executed by the at least one processor, obtains the first credential information and the second credential information for the entity by:
        generating at least one user interface in the context of the at least one application component; and
        collecting the first credential information and the second credential information via the at least one user interface.

2. The computer-readable storage medium of claim 1, wherein the entity is a device and the at least one application component, when executed, obtains device credential information.

3. The computer-readable storage medium of claim 1, wherein:
    the entity is a user;
    the at least one user interface comprises a first user interface and a second user interface; and
    the at least one application component, when executed, obtains the first user credential information through the first user interface and the second user credential information through the second user interface.

4. The computer-readable storage medium of claim 3, wherein the at least one application component, when executed:
    obtains first parameters of the first user credentials from the authentication component;
    builds the first user interface using the first parameters;
    receives second parameters of the second user credentials from the authentication component; and
    builds the second user interface using the second parameters.

5. The computer-readable storage medium of claim 4, wherein:
    the authentication component comprises a first Extensible Authentication Protocol (EAP) component;
    the computer-readable medium further comprises a second EAP component that, when executed, performs a second method of authenticating the entity using third credential information; and
    the at least one application component, when executed, builds a first user interface thorough which the application prompts a user to enter the first credential information and the third credential information.

6. The computer-readable storage medium of claim 4, wherein the first user credentials may be stored with the at least one application component as stored first used credentials.

7. The computer-readable storage medium of claim 6, wherein the stored first user credentials may be dynamically updated using the second user credentials.

8. The computer-readable storage medium of claim 1, wherein the authentication component, when executed, identifies that the second credential information is required to complete authentication and sends a notification to the at least one application component, the notification comprising parameters of the second credential information.

9. The computer-readable storage medium of claim 1, wherein the interface comprises a first application programming interface, a second application programming interface, a third application programming interface, and a fourth application programming interface, the first application programming interface providing a first credential definition from the authentication component to the at least one application component, the second application programming interface providing first credential information from the at least one application component to the authentication component, the third application programming interface providing a second credential definition from the authentication component to the at least one application component, and the fourth application programming interface providing second credential information from the at least one application component to the authentication component.

10. The computer-readable storage medium of claim 1, wherein the authentication component may further provide at least one notification to the at least one application component.

11. The computer-readable storage medium of claim 1, wherein the second credential information comprises a dynamic update of the first credential information and the computer-readable medium further comprises a second application component, and the at least one application component is adapted to notify the second application component of the dynamic update.

12. The computer-readable storage medium of claim 1, wherein the at least one application component comprises a first application component that, when executed, obtains the first credential information and a second application component that, when executed, obtains the second credential information.

13. The computer-readable storage medium of claim 1, wherein the updated first credential information may be used to perform network access authentication and entity logon, with the network access authentication preceding the entity logon.

14. A method of operating a client device to authenticate an entity, comprising:
with at least one processor:
obtaining, with an application component, first credential information;
providing the first credential information to an authentication component via an interface between the application component and the authentication component;
interacting between the authentication component and an authenticator external to the client device using the first credential information;
identifying, by the authentication component, that second credential information is required;
providing, by the authentication component via the interface, second parameters of the second credential information to the first application component;
obtaining, with the application component, second credential information consistent with the second parameters; and
interacting between the authentication component and the authenticator external to the client device using the second credential information.

15. The method of claim 14, further comprising:
storing, with the application component, the credential information.

16. The method of claim 15, wherein:
the authentication component is a first Extensible Authentication Protocol (EAP) method; and
the method further comprises:
obtaining from a second EAP method third parameters of third credentials;
obtaining, with the application component, third credential information meeting the third parameters.

17. The method of claim 14, further comprising:
issuing at least one notification from the authentication component to the application component; and
building, with the application component, a notification interface based at least in part on the at least one notification.

18. A method of communicating between an Extensible Authentication Protocol (EAP) component and an application in a device, comprising the steps of:
with at least one processor:
identifying, by the EAP component, that credential information is required;
providing, by the EAP component, a description of the credential information, using credential parameters, to an interface between the EAP component and the application, wherein the application collects the credential information in accordance with the credential parameters by:
generating at least one user interface in the context of the at least one application; and
collecting the credential information via the at least one user interface; and
obtaining, by the EAP component, the collected credential information from the application.

19. The method of claim 18, further comprising:
issuing a notification from the (EAP) component to the application to provide the credential information consistent with the credential parameters, with the notification including the credential parameters.

20. The method of claim 19, further comprising updating previously provided credential information using the credential information.

* * * * *

UNITED STATES PATENT AND TRADEMARK OFFICE
CERTIFICATE OF CORRECTION

| | | |
|---|---|---|
| PATENT NO. | : 7,941,831 B2 | Page 1 of 1 |
| APPLICATION NO. | : 11/704844 | |
| DATED | : May 10, 2011 | |
| INVENTOR(S) | : Mandhana et al. | |

It is certified that error appears in the above-identified patent and that said Letters Patent is hereby corrected as shown below:

In column 17, line 25, in Claim 14, delete "the first" and insert -- the --, therefor.

Signed and Sealed this
Nineteenth Day of July, 2011

David J. Kappos
*Director of the United States Patent and Trademark Office*